US008635618B2

(12) United States Patent
Aggarwal et al.

(10) Patent No.: US 8,635,618 B2
(45) Date of Patent: Jan. 21, 2014

(54) METHOD AND SYSTEM TO IDENTIFY CONFLICTS IN SCHEDULING DATA CENTER CHANGES TO ASSETS UTILIZING TASK TYPE PLUGIN WITH CONFLICT DETECTION LOGIC CORRESPONDING TO THE CHANGE REQUEST

(75) Inventors: Vijay K. Aggarwal, Austin, TX (US);
Adam R. Holley, Austin, TX (US);
Arnaud A. Mathieu, Austin, TX (US);
Chakkalamattam J. Paul, Austin, TX (US); Puthukode G. Ramachandran, Austin, TX (US); Edward Whitehead, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1319 days.

(21) Appl. No.: 11/942,988

(22) Filed: Nov. 20, 2007

(65) Prior Publication Data
US 2009/0133026 A1    May 21, 2009

(51) Int. Cl.
*G06F 9/46* (2006.01)
*G06F 7/00* (2006.01)
*G06F 17/00* (2006.01)

(52) U.S. Cl.
USPC ............................ 718/102; 718/107; 707/609

(58) Field of Classification Search
USPC ........................................................ 718/102
See application file for complete search history.

(56) References Cited

U.S. PATENT DOCUMENTS

| | | | |
|---|---|---|---|
| 5,797,128 A * | 8/1998 | Birnbaum | 1/1 |
| 6,564,369 B1 * | 5/2003 | Hove et al. | 717/121 |
| 7,392,546 B2 * | 6/2008 | Patrick | 726/26 |
| 7,440,973 B2 * | 10/2008 | Tsukerman et al. | 1/1 |
| 7,590,669 B2 * | 9/2009 | Yip et al. | 1/1 |
| 7,591,000 B2 * | 9/2009 | Griffin et al. | 726/1 |
| 7,607,164 B2 * | 10/2009 | Vasishth et al. | 726/1 |
| 8,250,540 B2 * | 8/2012 | Kulaga et al. | 717/126 |
| 2004/0139193 A1 | 7/2004 | Refai et al. | |
| 2005/0204358 A1 | 9/2005 | Hellerstein et al. | |
| 2006/0161444 A1 | 7/2006 | Lubrecht et al. | |

(Continued)

OTHER PUBLICATIONS

Dames et al., "Achieving End-to-End SLA Management of Convergent ICT Solutions", The Journal of the Communications Network, vol. 5, Part 3, Jul.-Sep. 2006, pp. 3-14.

(Continued)

*Primary Examiner* — Lewis A Bullock, Jr.
*Assistant Examiner* — Kevin X Lu
(74) *Attorney, Agent, or Firm* — Stephen R. Tkacs; Stephen J. Walder, Jr.; Jeffrey S. LaBaw (57) ABSTRACT

An information technology services management product is provided with a change management component that identifies conflicts based on a wide range of information. When a change on a configuration item is scheduled, the change management component identifies, for example, affected business applications, affected service level agreements, resource availability, change schedule, workflow, resource dependencies, and the like. The change management component warns the user if a conflict is found. The user does not have to consult multiple sources of information and make a manual determination concerning conflicts. The change management component may also suggest a best time to schedule a change request based on the information available. The change management component provides a constrained interface such that the user cannot schedule a change request that violates any of the above requirements. The change management component also applies these requirements when changing an already scheduled change request.

19 Claims, 7 Drawing Sheets

(56) References Cited

U.S. PATENT DOCUMENTS

| | | | |
|---|---|---|---|
| 2006/0224663 A1 | 10/2006 | DiFalco | |
| 2006/0236061 A1 | 10/2006 | Koclanes | |
| 2006/0248118 A1* | 11/2006 | Curtis et al. | 707/104.1 |
| 2007/0005320 A1 | 1/2007 | Vinberg et al. | |
| 2007/0005740 A1 | 1/2007 | DiFalco et al. | |
| 2007/0168919 A1* | 7/2007 | Henseler et al. | 717/101 |
| 2007/0283049 A1* | 12/2007 | Rakowski et al. | 709/246 |
| 2008/0184248 A1* | 7/2008 | Barua et al. | 718/104 |

OTHER PUBLICATIONS

Ebbers et al., "Introduction to the New Mainframe: Large-Scale Commercial Computing", IBM Redbooks, Chapters 7 and 8, Dec. 2006, www.redbooks.ibm.com/redbooks/pdfs/sg247175.pdf, pp. 127-159.

"HP OpenView solution and product guide", Apr. 2006, h20229. www2.hp.com/products/openview_general/sg/ov_family_guide.pdf, 28 pages.

* cited by examiner

METHOD AND SYSTEM TO IDENTIFY CONFLICTS IN SCHEDULING DATA CENTER CHANGES TO ASSETS UTILIZING TASK TYPE PLUGIN WITH CONFLICT DETECTION LOGIC CORRESPONDING TO THE CHANGE REQUEST

BACKGROUND

1. Technical Field

The present application relates generally to an improved data processing system and method. More specifically, the present application is directed to a method and system to identify conflicts in scheduling data center changes to assets based on policies, service level agreements, change schedule, and impact analysis in an integrated manner.

2. Description of Related Art

A data center is the department that houses computer systems and related equipment, including the data library. The term "data center" often refers to any combination of hardware and software that is used to satisfy information technology (IT) requirements, including any servers, storage, network infrastructure, and so forth. Many companies employ services management applications to configure, schedule, and execute changes to the data center.

IT Infrastructure Library (ITIL®) is an important element of service management. ITIL® is one of the more comprehensive as well as non-proprietary and publicly available sets of guidelines for best practices in IT services management, owned by the British Office of Government Commerce (OGC). Each library module provides a code of practice intended to improve IT efficiencies, reduce risks, and increase the effectiveness and quality of IT services management and infrastructure.

A change management process is a component of services management that allows administrators and other authorized users to make changes to the data center. An operational management product (OMP) is a product that executes a change to the data center. An OMP may be found anywhere a task is effectuated. For example, an OMP may install firmware on a storage device. A user makes a change request, and the change management process issues a task to an OMP to effectuate the change. The OMP may then provide a response back to the change management process when the change is completed or if the change request cannot be satisfied.

A change request may affect a configuration item (CI) and may require a resource, such as a person in charge of the configuration item. Scheduling a change in a data center requires a lot of knowledge about the data center, such as affected business applications, affected service level agreements (SLAs), existing schedule of changes and other change requests, availability of resources, activities related to the change, etc. Current change management products may only take into account a small subset of this information. As a result, a user must consult multiple sources of information and to make sense out of that information manually.

For instance, a current IT management product may support associating a change task to particular people. Thus, the user may determine whether a resource, a person, is available at a particular time before scheduling the change request. However, the product may not take into account other information, such as what business applications are affected, how the change may affect SLAs, or whether the change request will conflict with other changes on the same CI. As another example, an IT management product may look at resource dependency, e.g., resources on which a specific resource is dependent. Again, even with this function, the user must still consult a wide range of information sources before scheduling a change request.

SUMMARY

The illustrative embodiments described herein recognize the disadvantages of the prior art and provide an information technology services management product with a change management component that identifies conflicts based on a wide range of information. When a change on a configuration item is scheduled, the change management component identifies, for example, affected business applications, affected service level agreements, resource availability, change schedule, resource dependencies, and the like. The change management component warns the user if a conflict is found. The user does not have to consult multiple sources of information and make a manual determination concerning conflicts. The change management component may also suggest a best time to schedule a change request based on the information available.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
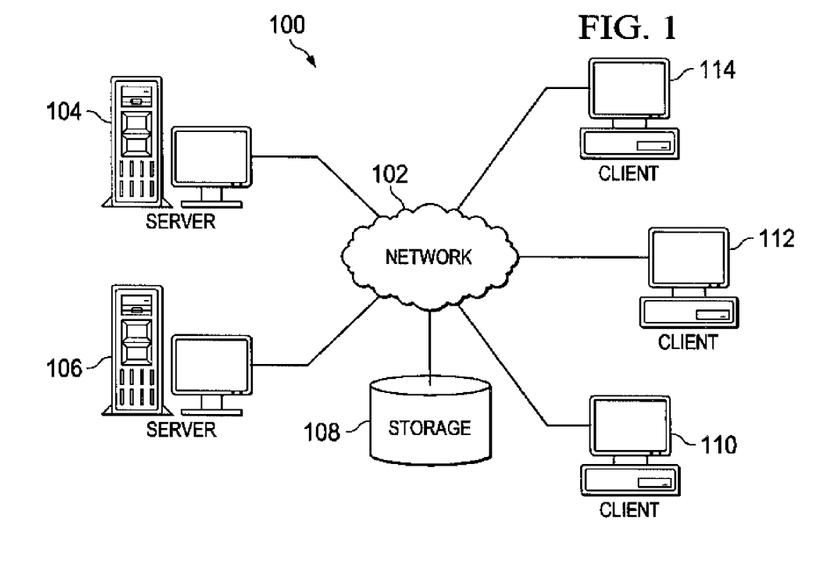
FIG. 1 is an exemplary representation of an exemplary distributed data processing system in which aspects of the illustrative embodiments may be implemented.
Figure 2:
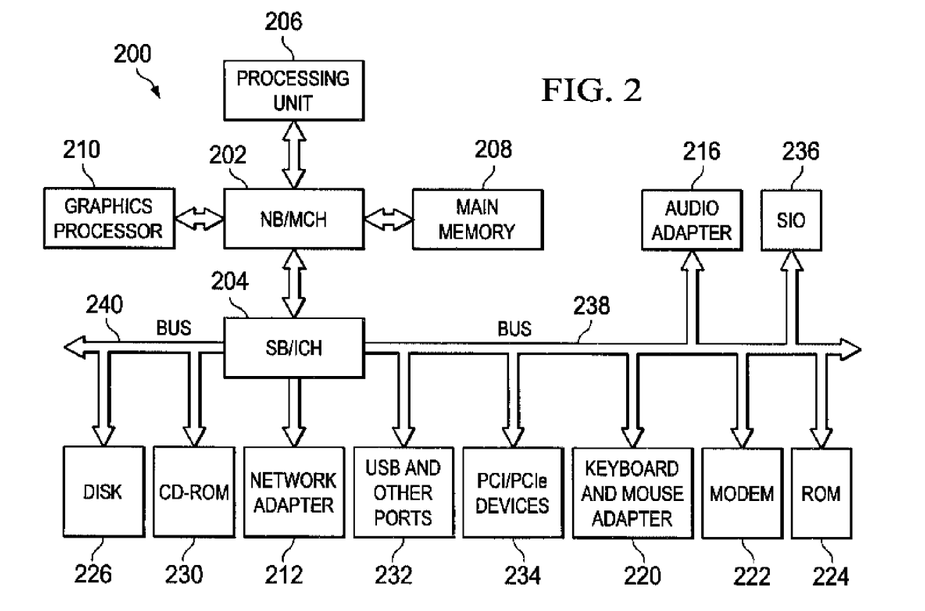
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 maybe, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In one illustrative embodiment, distributed data processing system 100 may constitute a data center for a company comprising servers 104, 106, storage systems, such as storage 108, and client computers 110-114. Network 102 may comprise switches and routers (not shown) to make up a network infrastructure. A user may manage distributed data processing system 100 using a services management product, which may be a software product running on a computer, such as server 104 or client 110 in FIG. 1.

Using a services management product, a user may make a change request. In accordance with one exemplary embodiment, the services management product may comprise a change management process that identifies conflicts based on a wide range of information. A services management product is also referred to herein as a configuration management system. When a change on a configuration item is scheduled, the change management component identifies, for example, affected business applications, affected service level agreements, resource availability, change schedule, resource dependencies, and the like. The change management component warns the user if a conflict is found. The user does not have to consult multiple sources of information and make a manual determination concerning conflicts. The change management component may also suggest a best time to schedule a change request based on the information available.

The change management component may make sure there is not already a change scheduled in the same time period on the same configuration item. The change management component may make sure the resource is available. For example, the change management component may determine whether a person with the right skill is available to perform the job. The change management component may make sure of approved down times for the configuration item, e.g., what business applications will be affected, the approved down times of business applications, whether the change will cause a violation of a service level agreement, etc. The change management component may determine whether there are any dependencies, such as whether any tasks on which the new task will depend have been completed.

The change management component provides a constrained interface such that the user cannot schedule a change request that violates any of the above requirements. The change management component also applies these requirements when changing an already scheduled change request.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed. Computer code embodying the invention may be stored on a hard disk on a server system and downloaded to a requesting client system so that it can be stored on the client system hard disk or other storage media.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
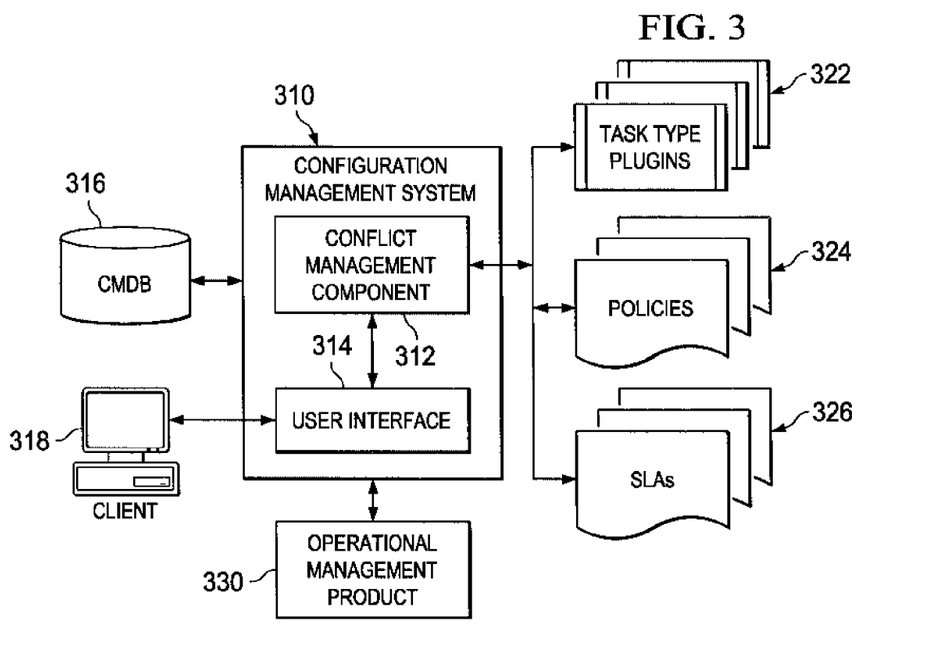
FIG. 3 is a block diagram of a configuration management system in accordance with an illustrative embodiment.

FIG. 3 is a block diagram of a configuration management system in accordance with an illustrative embodiment. Configuration management system 310 includes conflict management component 312 and user interface 314. Configuration management system 310 is connected to configuration management database (CMDB) 316, which stores information about configurable items and their relationships with business systems and applications. In accordance with an exemplary embodiment, CMDB 316 also stores information about changes scheduled on each configurable item (CI), tasks being done in configuration management system 310, and a calendar associated with the task.

The user enters a change request using client 318 via user interface 314. When a change is scheduled on a CI, conflict management component 312 warns the user if other changes are scheduled on the same CI in the same change window, finds all potentially impacted business applications and services, detects if the change violates any service level agreements 326, checks if the change window conflicts with the availability of the task owner, and informs the user of other tasks for the request for change that are scheduled in the same change window. In an alternative embodiment, information concerning service level agreements may be stored in CMDB 316.

In one exemplary embodiment, conflict management component 312 may check the change request against the following requirements: 1) whether there is not already a change scheduled in the same time period on the same configuration item; 2) whether the resource is available; 3) whether the change occurs within approved down times for the configuration item; and, 4) whether there are any dependencies, such as whether any tasks on which the new task will depend have been completed. More or fewer requirements may be enforced within the spirit and scope of the present invention. Conflict management component 312 may communicate with user interface 314 to constrain the creation of a change request such that the user cannot enter a change request that does not satisfy the requirements. User interface 314 may prompt the user to make changes to the change request when a conflict is discovered. Alternatively, conflict management component 312 and user interface 314 may suggest a best time for scheduling the change according to the requirements and policies.

Conflict management component 312 consults policies 324, which may define, for example, other constraints on scheduling, resource availability, approved down times, and the like. Policies may also include best practices for product management based on ITIL® best practices. Conflict management component 312 may then constrain change requests based on policies 324.

Configuration management system 310 may also accept task type plugins 322. Task type plugins provide conflict detection logic for particular task types. For example, for a software distribution task type, a corresponding one of plugins 322 may check the data on which the software image is planned to be scheduled.

When an acceptable change request is entered into configuration management system 310, and the change request satisfies all of the requirements of conflict management component 312, configuration management system 310 issues the change request as a task to operational management product 330 to effectuate the change. Operational management product 330 may execute the change task. Whether the change is successful or fails, operational management product 330 returns a response to configuration management system 310.

Figure 4:
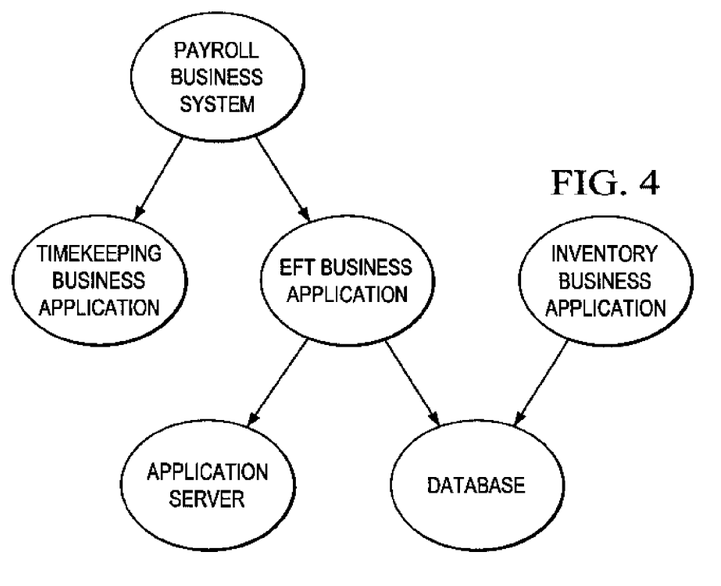
FIG. 4 depicts dependencies among configurable items in a data center in accordance with an illustrative embodiment.

FIG. 4 depicts dependencies among configurable items in a data center in accordance with an illustrative embodiment. The payroll business system depends on the timekeeping business application and the electronic funds transfer (EFT) business application. In turn, the EFT business application depends on the application server and the database. The inventory business application also depends on the database.

Thus, a change to the database would affect the inventory business application and the EFT business application, which in turn affects the payroll business system. To schedule a change to the database, the user would have to determine approved down times for the inventory business application, the EFT business application, and the payroll business system. Furthermore, to schedule a change to the database, the user must determine whether such a change would violate any service level agreements with respect to the affected configurable items. Similarly, a change to the timekeeping business application, such as a software update, would affect the payroll business system and any service level agreements tied to the payroll business system or timekeeping business application.

Figure 5:
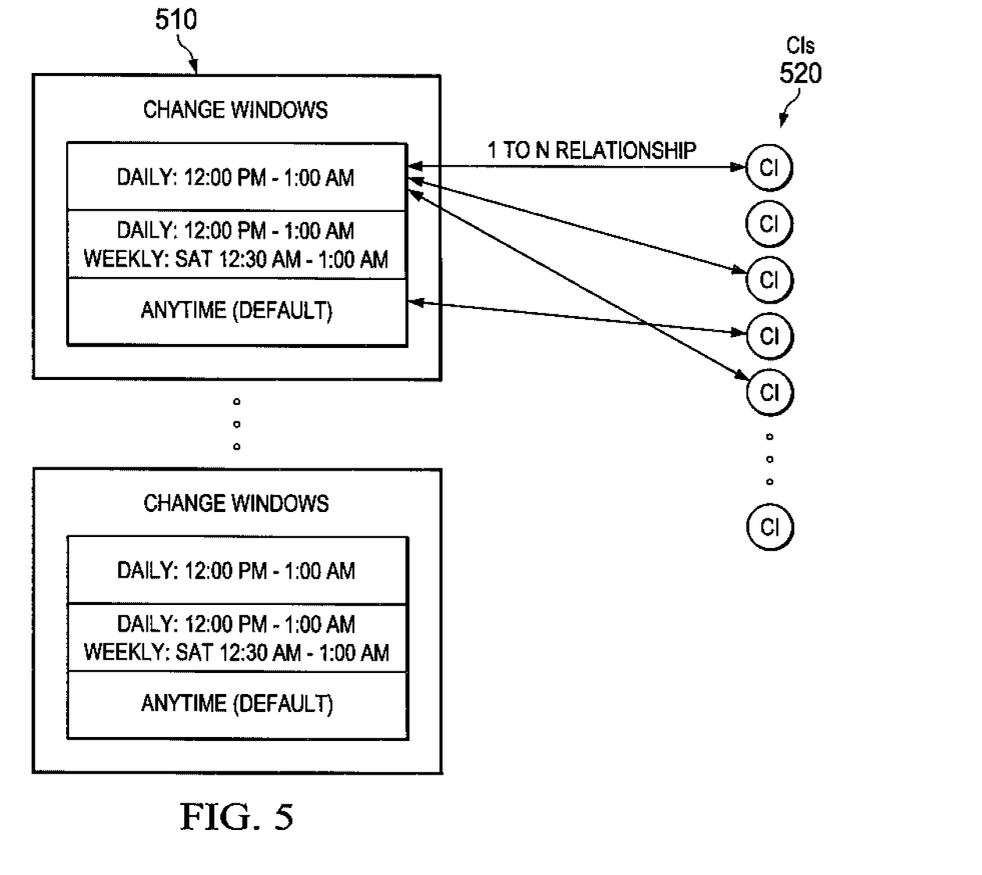
FIG. 5 illustrates the relationships between change windows and configurable items in accordance with an illustrative embodiment.

FIG. 5 illustrates the relationships between change windows and configurable items in accordance with an illustrative embodiment. Change windows 510 include a "Daily: 12:00PM-1:00AM" window, a "Daily: 12:00PM-1:00AM, Weekly: SAT 12:30AM-1:00AM" window, and an "ANYTIME" window. As shown in the example depicted in FIG. 5, configurable items (CIs) 520 are associated with respective ones of change windows 510. Each one of change windows 510 may be associated with one to N CIs 520, where N may be the number of CIs 520. For instance, the "Daily: 12:00PM-1:00AM" window is associated with three CIs. Only one change task in the same change window may be assigned to the same CI according to the illustrative embodiments.

Figure 6A:
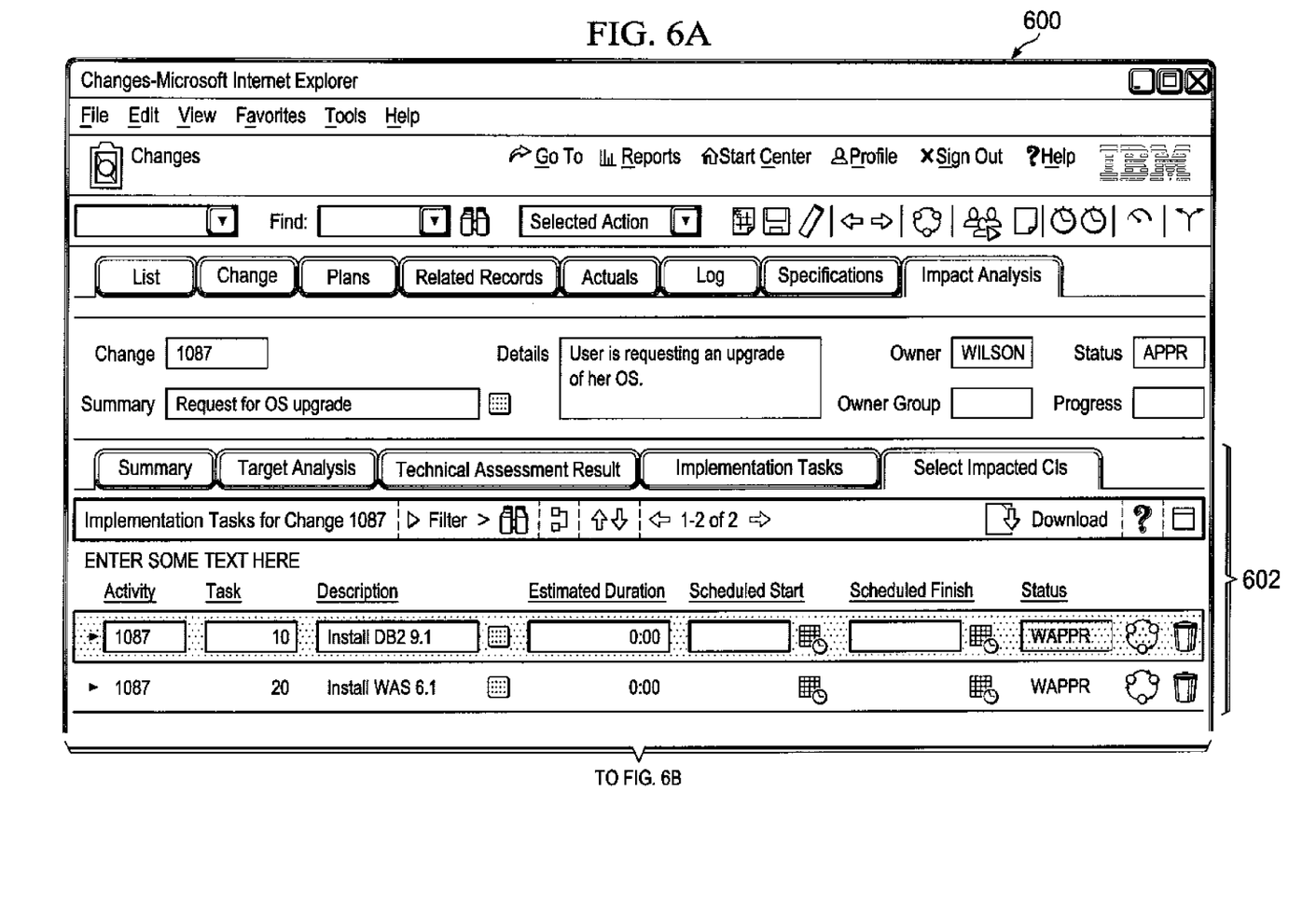
FIGS. 6A and 6B show an example screen of display for change request in a configuration management system in accordance with an illustrative embodiment.
Figure 6B:
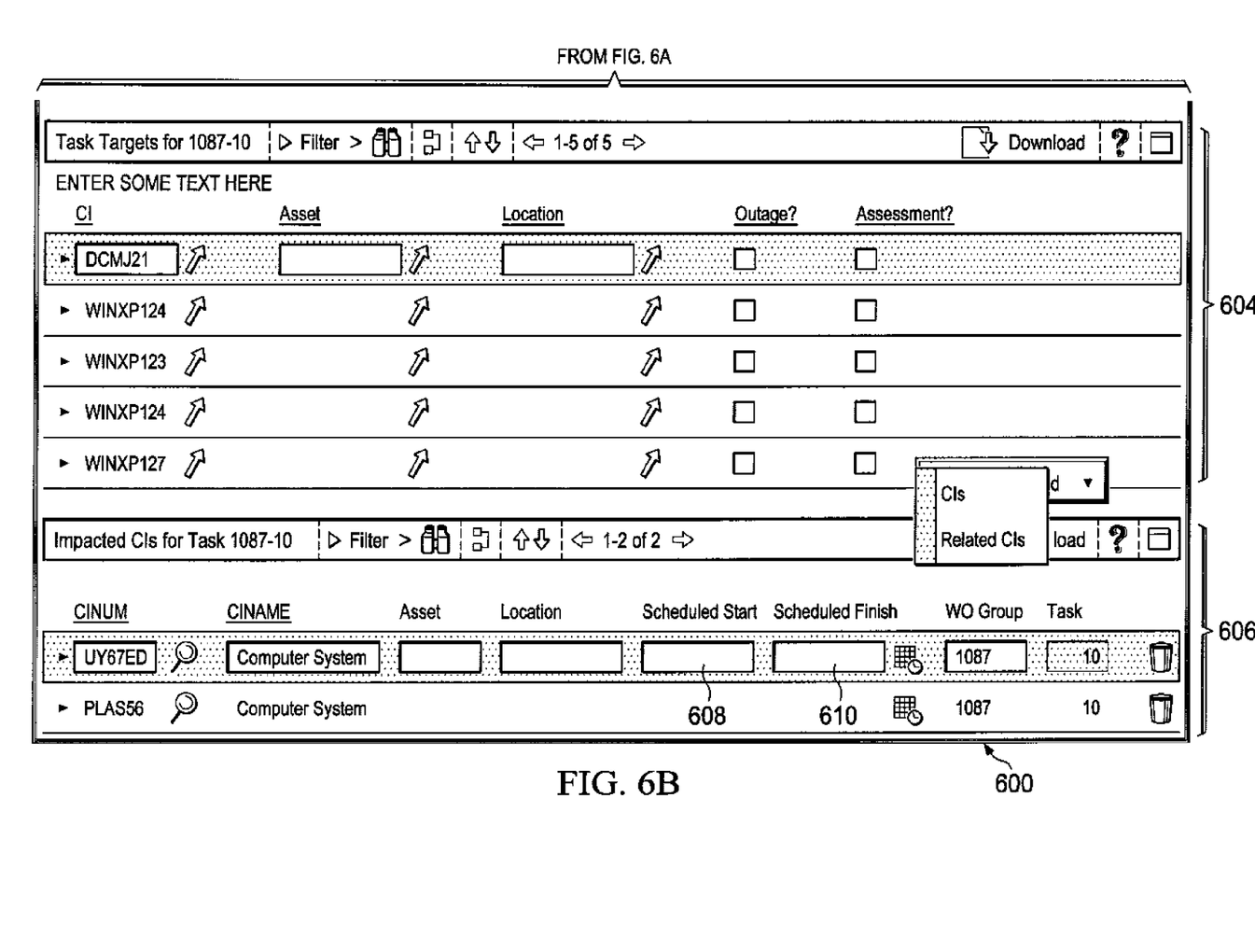

FIGS. 6A and 6B show an example screen of display for change request in a configuration management system in accordance with an illustrative embodiment. Window 600 is a user interface screen of display for a change request. Interface portion 602 depicts implementation tasks for a particular change request. The change request is shown as "Activity" with two different tasks. For each task, the user may enter a description, estimated duration, scheduled start time, and scheduled finish time in interface portion 602.

Interface portion 604 depicts task targets for a selected task. The task targets shown in interface portion 604 are configurable items with parameters including asset, location, outage, and assessment. In interface portion 604, the user may examine the CIs that are targeted by the selected change task. That is, installing a database update affects a number of configurable items, including various executable program files or other software components.

Interface portion 606 depicts impacted CIs for a selected task. These CIs may be indirectly impacted due to dependencies. Impacted CIs are shown with number, name, asset, location, group, and so forth. More particularly, the user may see the scheduled start time 608 and scheduled finish time 610 and whether these times are within the approved down times for these CIs.

Figure 7:
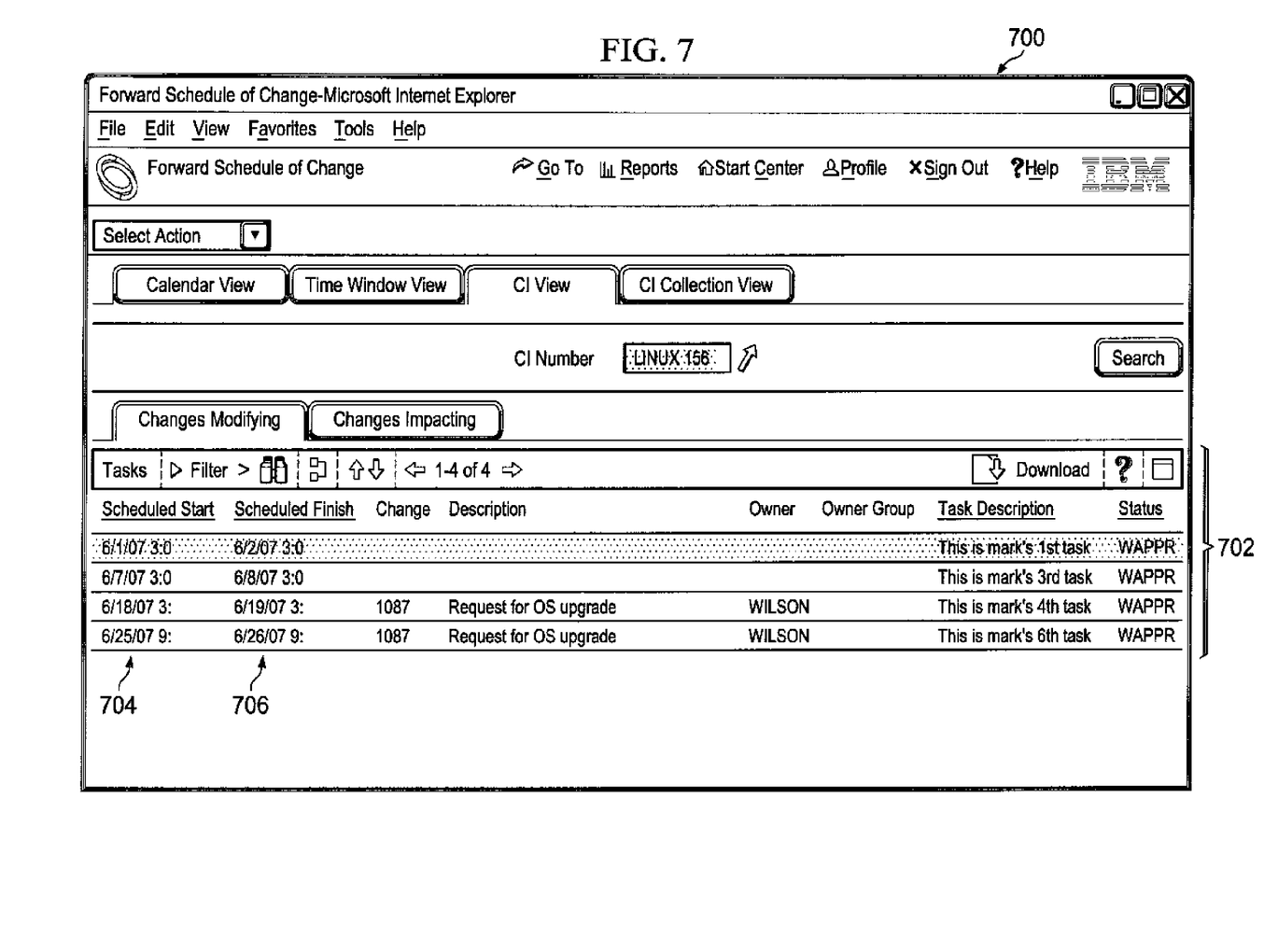
FIG. 7 is an example screen of display for a forward schedule of changes in a configuration management system in accordance with an illustrative embodiment.

FIG. 7 is an example screen of display for a forward schedule of changes in a configuration management system in accordance with an illustrative embodiment. Window 700 is a user interface screen of display for a forward schedule of changes. Interface portion 702 depicts the changes scheduled for a given configurable item (CI). For each change, interface portion 702 presents a scheduled start time 704 and scheduled finish time 706, as well as the associated change request, description, owner, owner group, and so forth. Thus, the user may quickly see whether any of the scheduled start times 704 and scheduled finish times 706 are outside the approved down times for the CI being examined.

Figure 8:
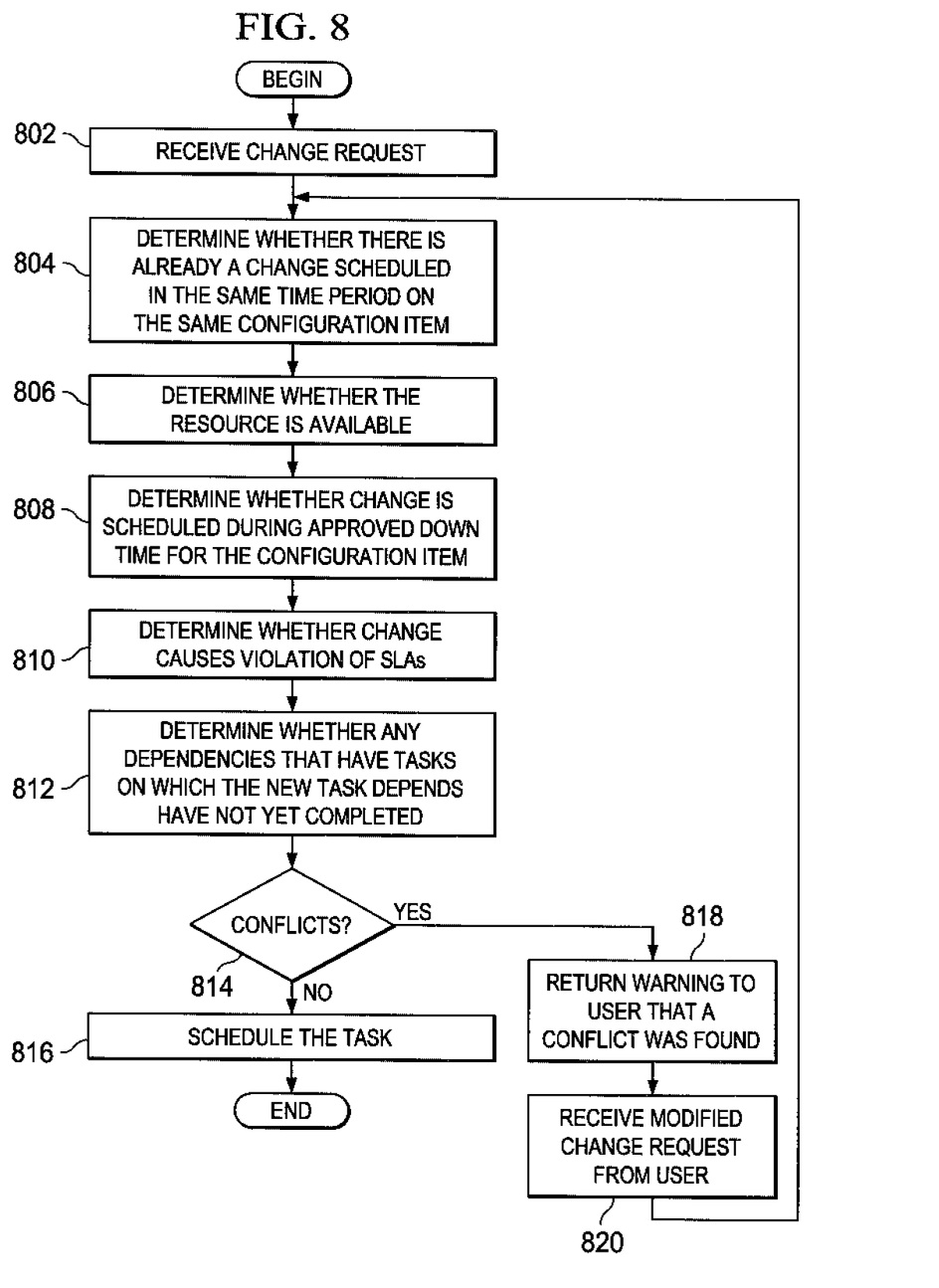
FIG. 8 is a flowchart illustrating operation of a configuration system in accordance with an illustrative embodiment.

FIG. 8 is a flowchart illustrating operation of a configuration system in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference to FIG. 8, operation begins, and the configuration management system receives a change request from a user (block 802). The change management component of the configuration management system determines whether there is already a change scheduled in the same time period on the same configuration item (block 804). The change management component then determines whether the resource is available (block 806). The change management component determines whether the change is scheduled during an approved down time for the configuration item (block 808). Then, the change management component determines whether the change causes a violation of any service level agreements (block 810). Thereafter, the change management component determines whether any dependencies that have tasks on which the new task depends have not yet completed (block 812).

Thereafter, the change management component determines whether there are any conflicts (block 814). If there are no conflicts, the configuration management system schedules the task (block 816) to effectuate the requested change.

Returning to block 814, if conflicts exist, the change management component returns a warning to the user that a conflict was found (block 818). The change management component then receives a modified change from the user (block 820), and operation returns to block 804 to check the modified request against the requirements of the change management component.

Thus, the illustrative embodiments solve the disadvantages of the prior art by providing an information technology services management product with a change management component that identifies conflicts based on a wide range of information. When a change on a configuration item is scheduled, the change management component identifies, for example, affected business applications, affected service level agreements, resource availability, change schedule, workflow, resource dependencies, and the like. The change management component warns the user if a conflict is found. The user does not have to consult multiple sources of information and make a manual determination concerning conflicts. The change management component may also suggest a best time to schedule a change request based on the information available.

The change management component may make sure there is not already a change scheduled in the same time period on the same configuration item. The change management component may make sure the resource is available. For example, the change management component may determine whether a person with the right skill is available to perform the job. The change management component may make sure of approved down times for the configuration item, e.g., what business applications will be affected, the approved down times of business applications, whether the change will cause a violation of a service level agreement, etc. The change management component may determine whether there are any dependencies, such as whether any tasks on which the new task will depend have been completed.

The change management component provides a constrained interface such that the user cannot schedule a change request that violates any of the above requirements. The change management component also applies these requirements when changing an already scheduled change request.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-recordable medium providing program code recorded thereon for use by or in connection with a computer or any instruction execution system. For the purposes of this description, a computer-usable or computer-recordable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-recordable medium include a semiconductor or solid state memory, magnetic tape, a removable computer diskette, a random access memory (RAM), a read-only memory (ROM), a rigid magnetic disk, and an optical disk. Current examples of optical disks include compact disk—read-only memory (CD-ROM), compact disk—read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a configuration management system, for identifying conflicts in scheduling data center changes, the method comprising:
   receiving, by the configuration management system, from a user a change request to perform a task to effect a change to a configurable item in a data center within a given time window;
   selecting, by a conflict management component, a task type plugin from a plurality of task type plugins corresponding to a task type of the respective change request, wherein the task type plugin provides conflict detection logic for the task type of the change request to supplement the conflict management component;
   determining, by the conflict management component in the configuration management system, whether the change request has a conflict based on the configurable item and the given time window by invoking the selected task type plugin, wherein the conflict is based on one or more of: 1) tasks on which the change request depends not being completed, 2) a previously scheduled change request for the configurable item within the given time window, 3) a resource for effecting the change to the configurable item not being available within the given time window, or 4) a violation of a service level agreement;
   responsive to the selected task type plugin determining the change request results in a conflict, notifying the user of the conflict and requesting the user to modify the change request; and
   responsive to the selected task type plugin determining the change request does not result in a conflict based on the configurable item and the given time window, the conflict management component scheduling a task to effect the change to the configurable item within the given time window.

2. The method of claim 1, wherein determining whether the change request has a conflict comprises:
   determining whether the given time window is concurrent with an approved down time for the configurable item.

3. The method of claim 2, wherein determining whether the given time window is concurrent with an approved down time for the configurable item comprises:

identifying one or more business applications or systems that would be affected by the change to the configurable item; and determining whether the given time window is concurrent with an approved down time for the one or more business applications or systems.

4. The method of claim 1, wherein determining whether the change request has a conflict comprises:

determining whether tasks on which the change request depends have been completed.

5. The method of claim 1, wherein determining whether the change request has a conflict comprises:

determining whether there is a previously scheduled change request for the configurable item within the given time window.

6. The method of claim 1, wherein determining whether the change request has a conflict comprises:

determining whether a resource for effecting the change to the configurable item is available within the given time window.

7. The method of claim 1, wherein determining whether the change request has a conflict comprises:

determining whether the change to the configurable item within the given time window will result in a violation of a service level agreement.

8. The method of claim 1, wherein determining whether the change request has a conflict comprises:

determining whether the change request has a conflict based on policies that define at least one of constraints on scheduling, resource availability, approved downtimes, or best practices.

9. The method of claim 1, wherein scheduling the task comprises sending the task to an operational management product in the data center.

10. A configuration management system for identifying conflicts in scheduling data center changes, the configuration management system comprising:

a conflict management component; and a conflict management database;

a plurality of task type plugins that provide conflict detection logic for particular task types to supplement the conflict management component, wherein the conflict management component is configured to receive from a user a change request to perform a task to effect a change to a configurable item in a data center within a given time window;

wherein, the conflict management component is configured to select a task type plugin from the plurality of task type plugins corresponding to a task type of the respective change request, wherein the task type plugin provides conflict detection logic for the task type of the change request to supplement the conflict management component;

wherein the conflict management component is configured to determine whether the change request has a conflict based on the configurable item and the given time window by invoking the selected task type plugin, wherein the conflict is based on one or more of: 1) tasks on which the change request depends not being completed, 2) a previously scheduled change request for the configurable item within the given time window, 3) a resource for effecting the change to the configurable item not being available within the given time window, or 4) a violation of a service level agreement wherein responsive to the selected task type plugin determining the change request results in a conflict, the conflict management component is configured to notify the user of the conflict and request the user to modify the change request; and wherein responsive to the selected task type plugin determining the change request does not result in a conflict based on the configurable item and the given time window, the conflict management component is configured to schedule a task to effect the change to the configurable item within the given time window.

11. The configuration management system of claim 10, wherein determining whether the change request has a conflict comprises:

determining whether the given time window is concurrent with an approved down time for the configurable item, determining whether tasks on which the change request depends have been completed, determining whether there is a previously scheduled change request for the configurable item within the given time window, determining whether a resource for effecting the change to the configurable item is available within the given time window, and determining whether the change to the configurable item within the given time window will result in a violation of a service level agreement.

12. The configuration management system of claim 11, wherein determining whether the given time window is concurrent with an approved down time for the configurable item comprises:

identifying one or more business applications or systems that would be affected by the change to the configurable item based on information in the conflict management database; and determining whether the given time window is concurrent with an approved down time for the one or more business applications or systems.

13. The configuration management system of claim 10, wherein responsive to the change request not having a conflict, the conflict management component is configured to schedule a task to effect the change to the configurable item within the given time window.

14. The configuration management system of claim 10, wherein the configuration management database stores information about configurable items, relationships between configurable items and business systems and applications, information about changes scheduled on each configurable item, tasks being done in the configuration management system, and a calendar associated with each task.

15. The configuration management system of claim 10, wherein determining whether the change request has a conflict comprises:

determining whether the change request has a conflict based on policies that define at least one of constraints on scheduling, resource availability-, approved downtimes° or best practices.

16. A computer program product comprising a non-transitory computer useable medium having a computer readable program, wherein the computer readable program, when executed on a computing device, causes the computing device to:

receive, by a configuration management system, from a user a change request to perform a task to effect a change to a configurable item in a data center within a given time window;

select, by a conflict management component, a task type plugin from a plurality of task type plugins corresponding to a task type of the respective change request, wherein the task type plugin provides conflict detection logic for the task type of the change request to supplement the conflict management component;

determine, by the conflict management component in the configuration management system, whether the change request has a conflict based on the configurable item and the given time window by invoking the selected task type plugin, wherein the conflict is based on one or more of: 1) tasks on which the change request depends not being completed, 2) a previously scheduled change request for the configurable item within the given time window, 3) a resource for effecting the change to the configurable item not being available within the given time window, or 4) a violation of a service level agreement;

responsive to the selected task type plugin determining the change request results in a conflict, notify the user of the conflict and request the user to modify the change request; and responsive to the selected task type plugin detecting the change request does not result in a conflict based on the configurable item and the given time window, schedule a task to effect the change to the configurable item within the given time window.

17. The computer program product of claim 16, wherein determining whether the change request has a conflict comprises:

determining whether the given time window is concurrent with an approved down time for the configurable item, determining whether tasks on which the change request depends have been completed, determining whether there is a previously scheduled change request for the configurable item within the given time window, determining whether a resource for effecting the change to the configurable item is available within the given time window, and determining whether the change to the configurable item within the given time window will result in a violation of a service level agreement.

18. The computer program product of claim 16, wherein the computer readable program comprises instructions that are stored in a computer readable storage medium in a data processing system, and wherein the instructions were downloaded over a network from a remote data processing system.

19. The computer program product of claim 16, wherein the computer readable program comprises instructions that are stored in a computer readable storage medium in a server data processing system, and wherein the instructions are downloaded over a network to a remote data processing system for use in a computer readable storage medium with the remote data processing system.

* * * * *